March 3, 1936. J. W. HAYES ET AL 2,032,699
PROCESS FOR THE PRODUCTION OF SODIUM NITRITE
Filed July 23, 1932
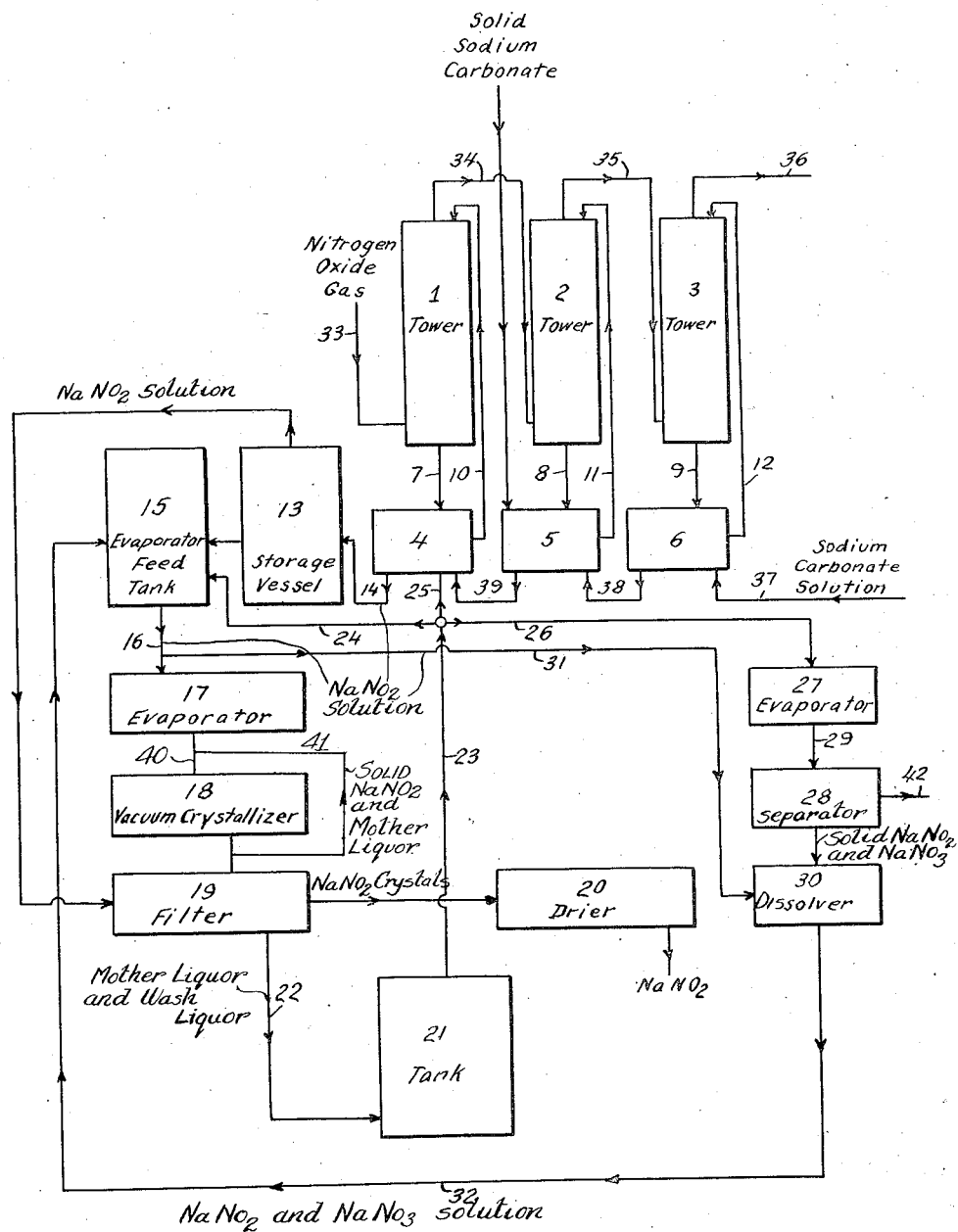
JOHN W. HAYES
HARRY C. BRITTON
INVENTORS
BY
ATTORNEY

Patented Mar. 3, 1936

2,032,699

UNITED STATES PATENT OFFICE

2,032,699

PROCESS FOR THE PRODUCTION OF SODIUM NITRITE

John W. Hayes and Harry C. Britton, Syracuse, N. Y., assignors to The Solvay Process Company, New York, N. Y., a corporation of New York Application July 23, 1932, Serial No. 624,200

8 Claims. (Cl. 23—104)

This invention relates to a process for the production of sodium nitrite by the absorption of nitrogen oxides in alkaline solutions such as solutions of sodium hydroxide or carbonate, and it is an object of this invention to provide a process whereby sodium nitrite of a high degree of purity may be recovered from the solution thus produced, with an economical utilization of the raw materials entering the process and their complete recovery, principally in the form of sodium nitrite, but also in the form of a mixed nitrite-nitrate by-product.

One feature of the invention is an improvement in the process for the absorption of nitrogen oxides in a solution of sodium carbonate to form sodium nitrite wherein the nitrogen oxides are passed in series through a plurality of absorption stages in contact with the solution and the solution is cooled to crystallize solid sodium nitrite, which improvement involves separating the crystallized solid sodium nitrite from the mother liquor and mixing the mother liquor with the sodium carbonate solution undergoing treatment with the nitrogen oxides. Another portion of the mother liquor is withdrawn and a mixed solid sodium nitrate-sodium nitrite product is recovered therefrom.

It is well known that sodium nitrite may be manufactured by the absorption of nitrogen oxides in solutions of sodium carbonate or sodium hydroxide. These nitrogen oxides may be produced by the catalytic oxidation of ammonia mixed with air in well known manner. The gas formed by the oxidation of ammonia is at a high temperature and contains, for example, about 9% NO mixed with oxygen and nitrogen from the air used for the oxidation of the ammonia. As this gas is cooled, reaction between the NO and oxygen takes place to form $NO_2$. The proportion of NO converted to $NO_2$ varies with the temperature to which the gas is cooled and the time elapsing between the cooling of the gas and the absorption of the nitrogen oxides. As is well known from published descriptions of procedures in the prior art, for absorbing nitrogen oxides to obtain a nitrite, the theoretical composition of the nitrogen oxides for nitrite formation is equal proportions of NO and $NO_2$ (corresponding to $N_2O_3$). It is usual, however, in these processes to have present an excess of nitric oxide (NO) over nitrogen dioxide ($NO_2$) in order to promote the formation of nitrite and minimize the amount of nitrate formed. The present invention relates to improvements in processes of making sodium nitrite, and in operating in accordance with this invention any of the various mixtures of nitric oxide and nitrogen dioxide which react to form a nitrite may be employed.

With reference to the drawing which illustrates an apparatus assembly suitable for carrying out the process of this invention, the numerals 1, 2 and 3 indicate absorption towers arranged for intimately contacting liquid and gas. The towers may contain a packing material over which a liquid introduced into the top of the tower flows downwardly countercurrent with gas which is introduced into the bottom of the tower. Each of towers 1, 2 and 3 is connected with a circulating tub 4, 5 and 6 respectively, to which liquid from the bottom of the tower drains through pipes 7, 8 and 9 and from which liquid may be recirculated through pipes 10, 11 and 12 by means of pumps not shown in the drawing, to the top of and into the towers. A storage vessel 13 is provided to which liquor from tub 4 may be passed through a pipe 14 and from which liquor may be withdrawn to an evaporator feed tank 15 which communicates through a pipe 16 with an evaporator 17. Numeral 18 indicates a vacuum crystallizer, 19 a filter for separating mother liquor and crystals formed in crystallizer 18, and 20 a drier, which may be of the rotary type, for the drying of the crystals from filter 19. A tank 21 serves as a receptacle for the mother liquor from filter 19 which passes to the tank through pipe 22. A pipe 23, through which mother liquor from tank 21 may be pumped, communicates with pipes 24, 25 and 26. Pipe 26 leads to an evaporator 27 which communicates with a separator 28 through a pipe 29. A dissolver 30 is provided for treatment of solids from separator 28 with liquor from evaporator feed tank 15 which is passed to dissolver 30 through a pipe 31 and returned to the evaporator feed tank through a pipe 32.

In utilizing the apparatus described above for the production of sodium nitrite, a nitrogen oxide gas such as may be obtained by the catalytic oxidation of ammonia, containing, for example, about 9% by volume of nitrogen oxides and being at an elevated temperature up to about 300° C., is passed through a pipe 33 into the bottom of tower 1 and upwardly through the tower to a pipe 34 which leads from the top of tower 1 to the bottom of tower 2. The nitrogen oxide gas then passes upwardly through tower 2, through pipe 35 to tower 3, and through tower 3 to exit pipe 36 from which it is discharged to the air. If desired, a larger or smaller number than the three towers shown in the drawing may be thus arranged for passing the nitrogen oxide gas in series through the towers.

A solution of sodium carbonate (soda ash) containing, for example, about 215 grams $Na_2CO_3$ per liter, is introduced into tub 6 from a pipe 37 and is circulated from tub 6 through pipe 12 to the top of tower 3 whence it passes downwardly through the tower in countercurrent flow with the nitrogen oxide gas passed therethrough and returns through pipe 9 to tub 6. Solution is withdrawn from tub 6 and passed to tub 5 through a pipe 38 for circulation through pipe 11, tower 2, where it contacts with the nitrogen oxide gas passed therethrough, and pipe 8 back to tub 5. Solution from tub 5 is similarly withdrawn through pipe 39 to tub 4 for circulation through tower 1 in contact with the nitrogen oxide gas and the solution from tub 4 is withdrawn to storage vessel 13 through pipe 14. Solid dry sodium carbonate is fed into the solution in tub 5 and dissolved therein to replace a part of the sodium carbonate in the original solution introduced into tub 6 which has reacted to form sodium nitrite during the treatment with the nitrogen oxide gases. Thus, for example, about 110 grams of sodium carbonate may be introduced into the liquor in tub 5 for every liter of sodium carbonate solution introduced into tub 6.

The sodium carbonate solution may be advanced through the system from tub to tub either continuously or discontinuously as the sodium carbonate is reacted with the nitrogen oxide gas to the desired extent. It is preferred, however, to operate as a batch process and, when the sodium carbonate content of the solution in tub 4 has been reduced to about 4 grams per liter, the solution in this tub is discharged to storage vessel 13, solution in tubs 5 and 6 is advanced to tub 4 and 5, respectively, and a new batch of fresh sodium carbonate solution introduced into tub 6 and the desired quantity of solid sodium carbonate introduced into the liquor in tub 5. By thus operating, the solution withdrawn from tub 4 may contain, for example, about 40 parts of sodium nitrite to about 1 part of sodium nitrate exclusive of the amounts of these two salts which are present in the liquor due to the return of solution from tank 21 (hereinafter described), which contains a higher proportion of sodium nitrate. The finished solution passed to vessel 13 may have an actual composition of 25% sodium nitrite, 5% sodium nitrate, and 0.3% sodium carbonate.

The sodium nitrite solution from storage vessel 13 is withdrawn to evaporator feed tank 15 and passes thence into evaporator 17 where it is concentrated until its sodium nitrite content has been increased to about 1000 grams per liter. The concentrated solution at a temperature of about 125° C. is passed through pipe 40 where it is mixed with mother liquor containing solid sodium nitrite from pipe 41. The mixture having a temperature of about 65° C. is introduced into vacuum crystallizer 18 where it is subjected to a vacuum of about 80 mm. pressure. By evaporation of a portion of the water from the solution the temperature of the remaining solution is lowered to about 55° C. and solid sodium nitrite crystalized from this solution. The mixture of crystals and mother liquor is in part passed to filter 19 where the mother liquor is separated from the crystals and in part returned through pipe 41 for mixing with additional hot evaporated liquor from evaporator 17 passing on its way to crystallizer 18. The mother liquor from filter 19 is passed to tank 21. The crystals are washed on filter 19 with solution from storage vessel 13 and this wash liquor is added to the mother liquor in tank 21. The washed sodium nitrite crystals are passed through a drier 20 from which they are withdrawn, cooled and may be packed for shipment.

The mixed mother liquor and wash liquors from tank 21 are pumped through pipe 23 and in part are returned through pipes 24 and 25 to evaporator feed tank 15 and tub 4 and in part are withdrawn through pipe 26 to evaporator 27. Of the liquor from tank 21 about 45% is returned to tub 4, about 45% is introduced into evaporator feed tank 15 and about 10% is withdrawn to evaporator 27. The liquor in tank 21 may contain, for example, about 33% sodium nitrite, about 17% sodium nitrate and about 1.1% sodium carbonate. The introduction of a portion of this liquor into the solution in tub 4 increases the concentration of sodium nitrate and nitrite in the solution. By treating the returned liquor together with the solution advanced from tub 5 with nitrogen oxides in tower 1, the sodium carbonate content of the returned liquor is reacted with the nitrogen oxides to form additional sodium nitrite. The solution from vessel 13, after being mixed in evaporator feed tank 15 with the portion of liquor from tank 21 returned to the evaporator feed tank and also with wash liquor returned as described below from dissolver 30, may have a composition of 28% sodium nitrite, 8% sodium nitrate and 0.4% sodium carbonate.

The portion of liquor from tank 21 which is withdrawn to evaporator 27 is partially evaporated to crystallize out solid sodium nitrite containing more or less sodium nitrate. This evaporation may be carried to the point at which the volume of evaporated liquor and solid is about 50% of the volume of liquor introduced into the evaporator. The mother liquor is separated from the solid crystals in separator 28 and is withdrawn through a pipe 42, to a graining pan in which it is evaporated to complete dryness to produce a dry granular product which may contain, for example, about 55% sodium nitrite and about 40% sodium nitrate. The solids in separator 28 are transferred to dissolver 30 where they are dissolved in solution from evaporator feed tank 15 and the resulting solution is returned to tank 15 for recovery of the sodium nitrite.

While, for purposes of illustration, the invention has been particularly described in connection with the process as carried out in the apparatus diagrammatically shown in the accompanying drawing, it is to be understood that various changes or modifications in the process of this example may be made without departing from the scope of the invention.

The process of this invention may be utilized for the production of nitrites of the alkali metals by treatment of solutions of alkaline compounds of the alkali metals. Thus, for example, potassium nitrite may be prepared by treating a solution of potassium carbonate or hydroxide in the manner described for treating sodium carbonate.

We claim:

1. In the process for the absorption of nitrogen oxides in a solution of sodium carbonate to form sodium nitrite wherein the nitrogen oxides are passed in series through a plurality of absorption stages in contact with said solution and the sodium nitrite solution thus produced is concentrated and cooled to crystallize solid sodium nitrite, that improvement which comprises mixing the concentrated solution at an elevated temperature with a cooler solution carrying in suspension therein solid crystalline sodium nitrite and subjecting the mixed solution to a vacuum to cool it by evaporation of water therefrom and to crystallize out solid sodium nitrite.

2. In the process for the absorption of nitrogen oxides in a solution of sodium carbonate to form sodium nitrite wherein the nitrogen oxides are passed in series through a plurality of absorption stages in contact with said solution and the sodium nitrite solution thus produced is concentrated and cooled to crystallize solid sodium nitrite, that improvement which comprises separating the said crystallized solid sodium nitrite from the mother liquor, returning a part of the mother liquor and mixing it with the aforesaid sodium carbonate solution and treating the mixture with nitrogen oxides, withdrawing another part of said mother liquor and recovering from the withdrawn liquor a mixed solid sodium nitrate-sodium nitrite product.

3. In the process for the absorption of nitrogen oxides in a solution of sodium carbonate to form sodium nitrite wherein the nitrogen oxides are passed in series through a plurality of absorption stages in contact with said solution and the sodium nitrite solution thus produced is concentrated and cooled to crystallize solid sodium nitrite, that improvement which comprises separating the crystallized solid sodium nitrite from the mother liquor and washing the separated nitrite with a portion of the sodium nitrite solution prior to its concentration.

4. In the process for the absorption of nitrogen oxides in a solution of sodium carbonate to form sodium nitrite wherein the nitrogen oxides are passed in series through a plurality of absorption stages in contact with said solution and the sodium nitrite solution thus produced is concentrated and cooled to crystallize solid sodium nitrite, that improvement which comprises mixing the evaporated solution at an elevated temperature with a portion of cooled sodium nitrite solution carrying in suspension therein solid crystalline sodium nitrite, subjecting the mixed solution to a vacuum to cool it by evaporation of water therefrom and to crystallize out sodium nitrite, returning a portion of the cooled solution for admixture with additional hot concentrated sodium nitrite solution in the manner described above, separating from the remaining cooled solution solid sodium nitrite, washing the solid nitrite with a portion of the sodium nitrite solution prior to its evaporation, separating the mother liquor and wash solution from the treatment of the solid sodium nitrite into a plurality of portions, returning one of said portions and mixing it with the aforesaid solution of sodium carbonate prior to at least the last of the series of treatments of the sodium carbonate solution with the nitrogen oxide gas, introducing another of said portions into the first mentioned sodium nitrite solution and withdrawing another of said portions of mother liquor and wash solution and recovering from this withdrawn portion a mixed solid sodium nitrite-sodium nitrate.

5. In the process for the absorption of nitrogen oxides in a solution of sodium carbonate to form sodium nitrite wherein the nitrogen oxides are passed in series through a plurality of absorption stages in contact with said solution and the sodium nitrite solution thus produced is concentrated and cooled to crystallize solid sodium nitrite, that improvement which comprises passing a substantially saturated solution of sodium carbonate in contact with said nitrogen oxide gas, introducing into the solution intermediate two of the stages of treatment solid sodium carbonate, evaporating the sodium nitrite solution thus produced, mixing the evaporated solution at an elevated temperature with a portion of cooled sodium nitrite solution carrying in suspension therein solid crystalline sodium nitrite, subjecting the mixed solution to a vacuum to cool it by evaporation of water therefrom and to crystallize out sodium nitrite, returning a portion of the cooled solution for admixture with additional hot concentrated sodium nitrite solution in the manner described above, separating from the remaining cooled solution solid sodium nitrite, washing the solid nitrite with a portion of the sodium nitrite solution prior to its evaporation, separating the mother liquor and wash solution from the treatment of the solid sodium nitrite into a plurality of portions, returning one of said portions and mixing it with the aforesaid solution of sodium carbonate prior to at least the last of the series of treatments of the sodium carbonate solution with the nitrogen oxide gas, introducing another of said portions into the first mentioned sodium nitrite solution and withdrawing another of said portions of mother liquor and wash solutions and partially evaporating this withdrawn portion to crystallize out solid sodium nitrite-sodium nitrate, separating the solid sodium nitrite-sodium nitrate from mother liquor, dissolving said solid in the first mentioned sodium nitrite solution and evaporating the last mentioned mother liquor to crystallize out a mixed solid sodium nitrite-sodium nitrate.

6. In a process for the recovery of sodium nitrite from a solution containing the same and a minor proportion of sodium nitrate wherein the solution is concentrated and solid sodium nitrite crystallized therefrom, that improvement which comprises separating the solid sodium nitrite from the mother liquor and washing the solid with the aforesaid nitrite solution prior to its concentration.

7. In a process for the recovery of solid sodium nitrite from a hot substantially saturated solution of sodium nitrite, that improvement which comprises mixing with said hot solution a cooler solution containing solid sodium nitrite in suspension therein and subjecting the mixed solution to a vacuum to cool it by evaporation of water therefrom and to crystallize out sodium nitrite.

8. In the process for the production of a nitrite of an alkali metal by absorption of nitrogen oxides in a solution of an alkaline compound of an alkali metal and crystallizing solid nitrite from the resulting solution, that improvement which comprises separating mother liquor from the solid nitrite, mixing a part of the mother liquor with the solution of an alkaline compound of an alkali metal, treating the resultant mixture with nitrogen oxides, withdrawing another part of the mother liquor and recovering therefrom a mixed solid nitrate-nitrite product.

JOHN W. HAYES.
HARRY C. BRITTON.